United States Patent
Kojo et al.

(10) Patent No.: US 9,789,917 B2
(45) Date of Patent: Oct. 17, 2017

(54) ARTICLE SUPPORT STRUCTURE FOR VEHICLE

(71) Applicant: HONDA MOTOR CO., LTD., Tokyo (JP)

(72) Inventors: Yuki Kojo, Utsunomiya (JP); Naoto Ogura, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/363,042

(22) Filed: Nov. 29, 2016

(65) Prior Publication Data
US 2017/0158263 A1    Jun. 8, 2017

(30) Foreign Application Priority Data
Dec. 4, 2015   (JP) ................. 2015-238056

(51) Int. Cl.
*B62D 43/10*    (2006.01)
*B62D 25/20*    (2006.01)

(52) U.S. Cl.
CPC ......... *B62D 43/10* (2013.01); *B62D 25/2027* (2013.01)

(58) Field of Classification Search
CPC .... B62D 21/152; B62D 21/155; B62D 25/08; B62D 25/2027; B62D 43/00; B62D 43/06; B62D 43/10; B60R 5/04
USPC ........... 296/37.14, 37.16, 37.2, 37.3, 187.11; 224/42.24
See application file for complete search history.

(56) References Cited

U.S. PATENT DOCUMENTS 8,857,898 B1 *  10/2014  Dubaisi ................. B62D 43/04
                                              296/187.11
2005/0236860 A1 * 10/2005 Nagamoto ............... B60R 7/04
                                              296/37.14

FOREIGN PATENT DOCUMENTS

JP         2011-084124 A     4/2011

* cited by examiner

*Primary Examiner* — Stephen Gordon
(74) *Attorney, Agent, or Firm* — Drinker Biddle & Reath LLP

(57) ABSTRACT

An article support structure for a vehicle includes a vehicle body floor (2) having a substantially flat reference placing surface (2A) onto which an article is placed and fixed, and a recessed section surface (2B) continuously formed at an edge of the reference placing surface (2A) and recessed downward with respect to the reference placing surface (2A), and an auxiliary supporting member detachably attached to the recessed section surface (2B) and configured to support a portion of the article placed on the reference placing surface (2A) from below, wherein the auxiliary supporting member (14) includes an article support surface (14c-1) having substantially same upper surface height as the reference placing surface (2A) in a state in which the auxiliary supporting member is attached to the recessed section surface (2B), and a fastening section configured to fasten the auxiliary supporting member with the recessed section surface (2B) and release the fastening.

14 Claims, 5 Drawing Sheets

ARTICLE SUPPORT STRUCTURE FOR VEHICLE

CROSS-REFERENCE TO RELATED APPLICATION

Priority is claimed on Japanese Patent Application No. 2015-238056, filed on Dec. 4, 2015, the contents of which are incorporated herein by reference.

BACKGROUND OF THE INVENTION

Field of the Invention

The present invention relates to an article support structure for a vehicle configured to support and fix an article such as a spare tire or the like with respect to a vehicle body floor.

Description of Related Art

As an article support structure configured to support and fix a spare tire with respect to a vehicle body floor, a structure in which the spare tire is placed sideways on a substantially flat placing surface in a recessed section of the vehicle body floor and a wheel section of the spare tire is fastened and fixed to a fixing bracket on the vehicle body floor is known (for example, see Japanese Unexamined Patent Application, First Publication No. 2011-84124).

SUMMARY OF THE INVENTION

In the article support structure for a vehicle of the related art, when the placing surface on the vehicle body floor is relatively flat as a whole, the article such as a spare tire or the like can be stably supported and fixed to the vehicle body floor. However, the article placing surface of the vehicle body floor cannot be easily flatly formed as a whole according to a design specification or the like of the vehicle.

For example, when a pulling hook is installed at a lower side of a rear end portion of vehicle body floor, or the like, a rear edge portion of the vehicle body floor may be formed to be recessed downward in a recessed shape. In this case, as a recessed section surface is continuously formed at a rear section of the substantially flat article placing surface on the vehicle body floor, when the article such as a spare tire or the like is installed on the vehicle body floor, a part of the article overhangs above the recessed section surface, and it is difficult to stably support a lower surface of the article.

As a countermeasure, providing a protrusion configured to support a lower surface of the article that is integrally formed on the recessed section surface of the vehicle body floor and supporting the lower surface of the article by the protrusion may be considered. However, in this case, a space above the recessed section surface is occupied by the protrusion when the article such as a spare tire or the like is not placed and fixed onto the vehicle body floor, and an effective space of the recessed section surface is narrowed.

An aspect of the present invention is directed to provide an article support structure for a vehicle capable of stably placing and fixing an article even when a recessed section surface is formed at a portion of a vehicle body floor but securing a large effective space above the recessed section surface when the article is not placed and fixed.

In order to solve the above-mentioned problems, an article support structure for a vehicle according to the present invention employs the following configurations.

(1) An article support structure for a vehicle according to the present invention includes a vehicle body floor having a substantially flat reference placing surface onto which an article is placed and fixed, and a recessed section surface continuously formed at an edge of the reference placing surface and recessed downward with respect to the reference placing surface; and an auxiliary supporting member detachably attached to the recessed section surface and configured to support a portion of the article placed on the reference placing surface from below, wherein the auxiliary supporting member includes an article support surface having substantially the same upper surface height as the reference placing surface in a state in which the auxiliary supporting member is attached to the recessed section surface, and a fastening section configured to fasten the auxiliary supporting member with the recessed section surface and release the fastening.

According to the configuration of the above mentioned (1), as the auxiliary supporting member is fastened to the recessed section surface of the vehicle body floor, the article support surface of the auxiliary supporting member has substantially the same height as the reference placing surface of the vehicle body floor. Accordingly, when the article is placed on the reference placing surface, the lower surface of the portion of the article overhanging toward the recessed section surface is supported by the article support surface of the auxiliary supporting member. In addition, when the article is not placed and fixed onto the vehicle body floor, as the fastening of the fastening section of the auxiliary supporting member is released, the auxiliary supporting member can be removed from the recessed section surface. Accordingly, a large effective space on the vehicle body floor can be secured.

(2) In the aspect of the above mentioned (1), a fastening bracket having a fastening part, to which the fastening section of the auxiliary supporting member is fastened, may be joined to the recessed section surface.

In this case, when the auxiliary supporting member is fastened to the recessed section surface, the auxiliary supporting member is fastened to the fastening part of the fastening bracket joined to the recessed section surface and when the auxiliary supporting member is removed from the recessed section surface, the fastening of the auxiliary supporting member can be released from the fastening part of the fastening bracket. In addition, since the fastening bracket having the fastening part is joined to the recessed section surface, the fastening part can be easily disposed at the recessed section surface. In addition, while the fastening bracket is always joined to the recessed section surface, in comparison with the state in which the auxiliary supporting member is fastened and fixed, an occupied space in the recessed section surface is reduced.

(3) In the aspect of the above mentioned (2), the fastening bracket may have a joining surface joined to the recessed section surface, and a fastening surface disposed upper than the joining surface and to which the auxiliary supporting member is fastened.

In this case, since the fastening surface of the fastening bracket is disposed upper than the joining surface joined to the recessed section surface, there is no need to form holes in the recessed section surface of the vehicle body floor to avoid the fastening member installed at the fastening bracket from interfering with the recessed section surface. For this reason, the vehicle body floor can be easily processed and intrusion of water or dust from the holes can be prevented.

(4) In the aspect of the above mentioned (3), the auxiliary supporting member may have an abutting wall that abuts the fastening surface of the fastening bracket, and a support wall which is bent upward from the abutting wall in a crank shape and having an upper surface serving as the article support surface.

In this case, by changing the bending deformation of the auxiliary supporting member, a shape of the article support surface of the auxiliary supporting member can be easily changed. For this reason, it is possible to easily manage with vehicles or articles having different specifications.

(5) In the aspect of any one of the above mentioned (2) to (4), the fastening bracket and the auxiliary supporting member may be disposed at positions offset in the forward and rearward direction of the vehicle body with respect to a bending inducing position of the vehicle body upon input of an impact.

In this case, when the vehicle body is bent and deformed about the bending inducing position upon input of an impact, the fastening bracket and the auxiliary supporting member are prevented from interfering with bending deformation of the vehicle body about the bending inducing position. For this reason, the vehicle body is bent as desired to efficiently absorb impact energy, and it is possible to suppress a collapse of a portion of the vehicle body where it is not intended to be collapsed, as designed.

(6) In the aspect of any one of the above mentioned (2) to (5), an energy absorption member extending substantially in the forward and rearward direction of the vehicle body may be disposed under the vehicle body floor, and the fastening bracket and the auxiliary supporting member may be disposed at positions spaced apart from the energy absorption member in a leftward and rightward direction of the vehicle body.

In this case, since the fastening bracket and the auxiliary supporting member are disposed to be spaced apart from the energy absorption member of the vehicle body, when an impact load is input into the vehicle body and the energy absorption member collapses, the fastening bracket or the auxiliary supporting member is prevented from interfering with collapse of the energy absorption member. Accordingly, as this structure is employed, the energy absorption member can function as desired.

(7) In the aspect of any one of the above mentioned (2) to (6), the recessed section surface may have a substantially horizontal lower surface section disposed lower than the reference placing surface, and an inclined surface section configured to connect the lower surface section and the reference placing surface, and the fastening bracket may be joined to the inclined surface section.

In this case, since the fastening bracket is joined to the inclined surface section that connects the reference support surface of the vehicle body floor and the lower surface section of the recessed section, the load input into the auxiliary supporting member from above can be distributed to and supported by the reference support surface and the lower surface section of the vehicle body floor via the fastening bracket and the inclined surface section. Accordingly, as this structure is employed, it is possible to achieve sufficient support strength with respect to the input load in the upward and downward direction.

According to the aspect of the present invention, since the auxiliary supporting member configured to support a portion of the article from below is attached to the recessed section surface of the vehicle body floor and the auxiliary supporting member includes the article support surface having substantially the same upper surface height as the reference placing surface of the vehicle body floor and the fastening section that enables fastening to the recessed section surface and release of the fastening, the article can be stably placed and fixed even when the recessed section surface is formed at a portion of the vehicle body floor, and further, when the article is not placed or fixed, a large effective space above the recessed section surface can be secured.

DETAILED DESCRIPTION OF THE INVENTION

Figure 1:
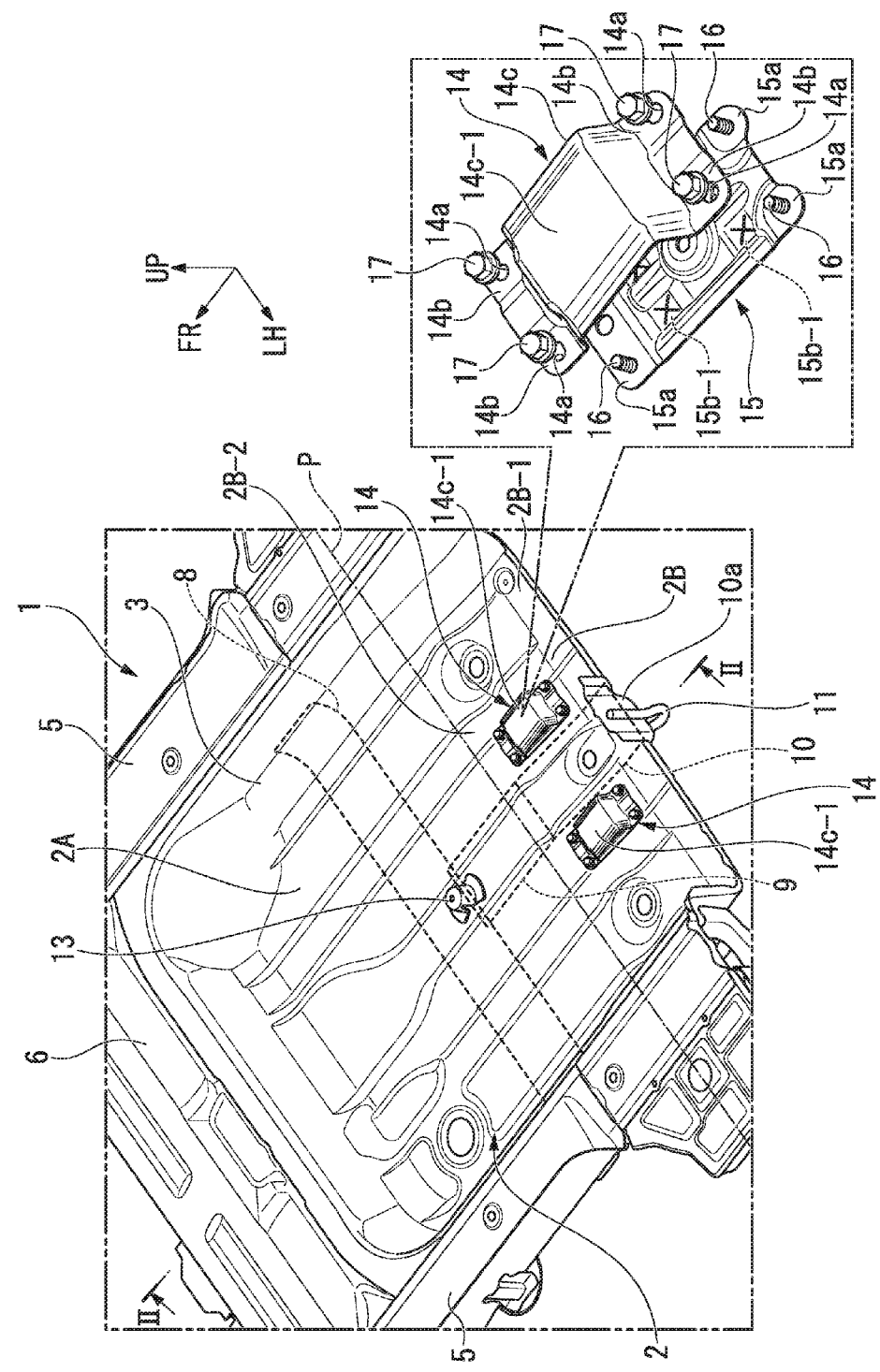
FIG. 1 is a perspective view showing a rear section of a vehicle body of a vehicle according to an embodiment of the present invention when seen from a rear upper side.

Hereinafter, an embodiment of the present invention will be described based on the accompanying drawings. Further, directions of forward, rearward, leftward, rightward, and so on, in the following description are the same as directions of a vehicle in the following description unless the context clearly indicates otherwise. In addition, an arrow FR showing a front side of a vehicle, an arrow LH showing a left side of the vehicle, and an arrow UP showing a top side of the vehicle are shown at appropriate places in the drawings.

Figure 2:
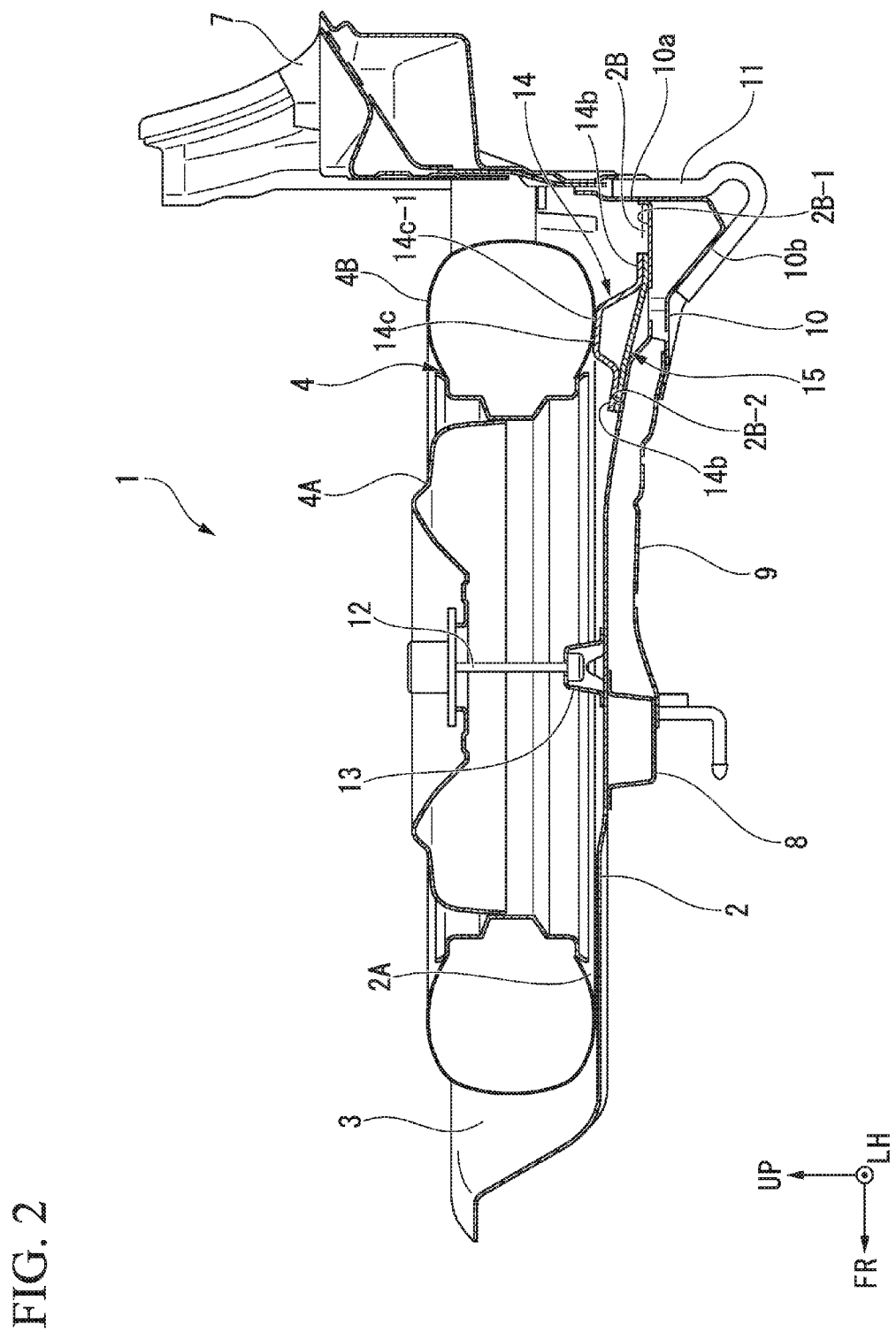
FIG. 2 is a cross-sectional view taken along line II-II of FIG. 1 of the vehicle according to the embodiment of the present invention.
Figure 3:
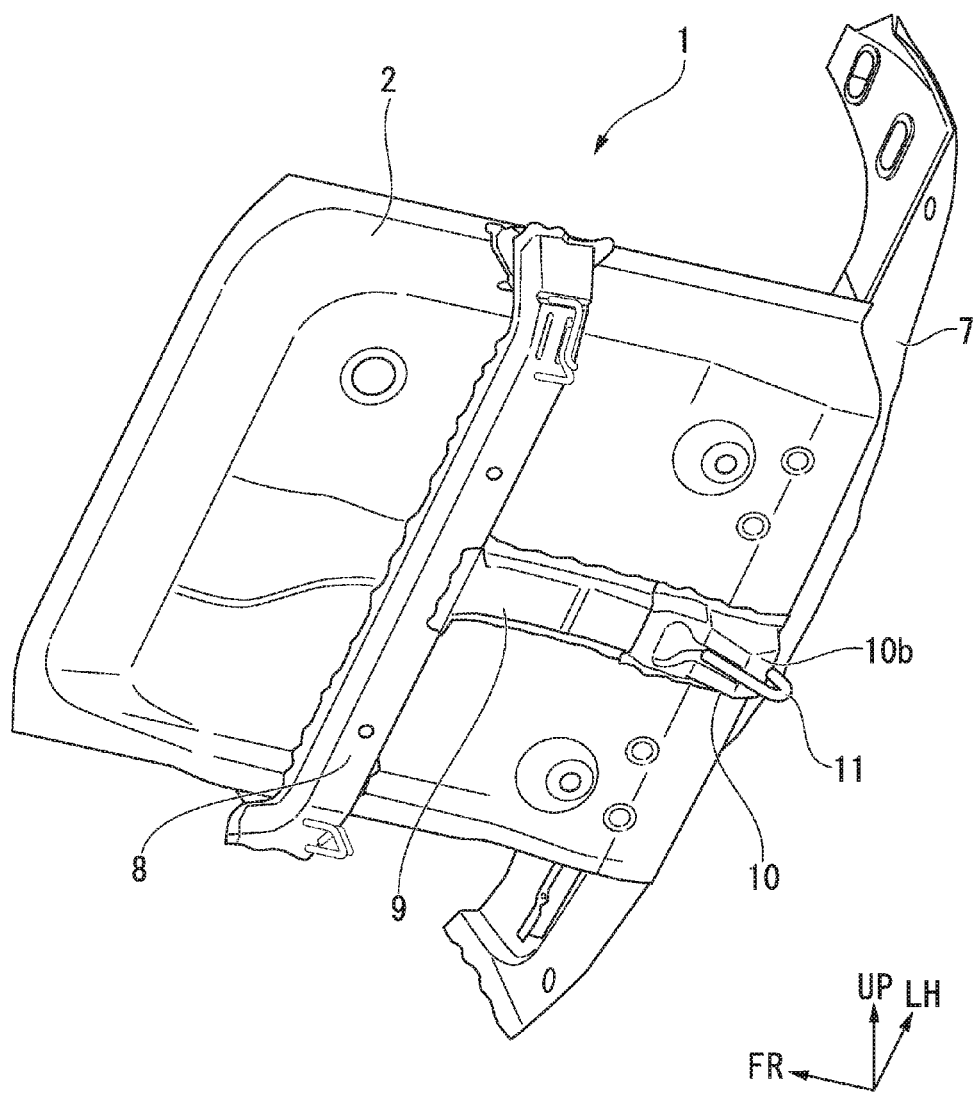
FIG. 3 is a perspective view of the rear section of the vehicle body of the vehicle according to the embodiment of the present invention when seen from a front lower side.

FIG. 1 is a view showing a portion of a vehicle body floor 2 of a luggage space of a vehicle 1, and FIG. 2 is a view showing a cross section of the vehicle 1 corresponding to a cross section taken along line II-II of FIG. 1. In addition, FIG. 3 is a view showing a portion of the vehicle body floor 2 of the luggage room of the vehicle 1 when seen from a lower side of a left front section.

The vehicle 1 according to the embodiment is a vehicle in which a luggage room is installed behind a passenger compartment. In a floor surface portion of the luggage room, an article accommodating section 3 recessed downward in a recessed shape in a substantially rectangular shape when seen in a plan view is formed at a central portion of the vehicle body floor 2 of the luggage room, and an upper side of the article accommodating section 3 is closed to be opened and closed by a floor board (not shown). Luggage put in and taken out upon normal use of the vehicle is placed on a floor board. An article that is not frequently used in normal times such as a spare tire or the like is placed and fixed at the article accommodating section 3 under the floor board. In the embodiment, a configuration in which a spare tire 4 (an article) is placed and fixed at the article accommodating section 3 will be described.

However, the article accommodated in the article accommodating section 3 is not limited to the spare tire 4 but may be a battery box, an intelligent power unit (IPU) in which a control device and a battery are integrated as a block, a tool box, or the like.

A frame section of a rear section of the vehicle body includes a pair of left and right rear side-frames 5 extending substantially in forward and rearward direction of the vehicle body at both of left and right sides under the luggage room, a floor cross member 6 extending substantially in a vehicle width direction and configured to connect front end portions of the left and right rear side-frames 5, and a rear panel 7 of the vehicle body connected to rear end portions of the left and right rear side-frames 5 and configured to close a rear end portion of the article accommodating section 3. The front end portions of the left and right rear side-frames 5 are connected to a side seal (not shown) serving as a frame member of a lower end of a side portion of the passenger compartment, and a rear bumper (not shown) is coupled to the rear end portions of the left and right rear side-frames 5.

The vehicle body floor 2 that constitutes the article accommodating section 3 is constituted by a metal panel such as a steel plate or the like. The front edge portion and the left and right side edge portions of the vehicle body floor 2 are joined to the floor cross member 6 and the left and right rear side-frames 5. The vehicle body floor 2 has a central region recessed downward with respect to a front end portion joined to the floor cross member 6 and both of left and right end portions joined to a rear side-frame 5, and an upper surface of the recessed section is substantially horizontally formed from the front end portion to a vicinity portion of the rear edge portion. The rear edge portion of the upper surface of the recessed section is further recessed below than the upper surface of the recessed section which is located forward than the rear edge portion. The upper surface of the recessed section located at the forward side than the rear edge portion of the recessed section of the vehicle body floor 2 is made as a reference placing surface 2A onto which the article such as the spare tire 4 or the like is placed and fixed, and the upper surface of the rear edge portion constitutes a recessed section surface 2B recessed downward with respect to the reference placing surface 2A.

As shown in FIG. 3, a sub cross member 8 extending substantially in the vehicle width direction is disposed at a substantially central section in the forward and rearward direction of the vehicle body in the lower surface of the vehicle body floor 2. The sub cross member 8 is formed in a shape that substantially follows a lower surface shape of the vehicle body floor 2, and both end portions of the sub cross member are coupled to the rear side-frame 5 shown in FIG. 1. Further, in FIG. 3, illustration of the rear side-frame 5 is omitted. The sub cross member 8 is formed in a hat type cross-sectional shape opening at an upper side of the vehicle body, and an upper surface of the sub cross member is joined to a lower surface of the vehicle body floor 2.

In addition, an auxiliary frame 9 extending from the rear end portion of the sub cross member 8 toward a rear side of the vehicle body and an energy absorption member 10 having a front end portion joined to the auxiliary frame 9 and extending from the joining section with the auxiliary frame 9 toward the rear side of the vehicle body are disposed at a substantially central section in the vehicle width direction of the lower surface of the vehicle body floor 2.

Both of the auxiliary frame 9 and the energy absorption member 10 have a cross section crossing with the extending direction and having a hat shape, and upper surfaces of the auxiliary frame 9 and the energy absorption member 10 are joined to the lower surface of the vehicle body floor 2. The front end portion of the auxiliary frame 9 is joined to the sub cross member 8, and the rear end portion of the energy absorption member 10 is closed by an end wall 10a as shown in FIG. 2. The end wall 10a extends upward from the vehicle body floor 2 over the rear end surface of the vehicle body floor 2.

The auxiliary frame 9 and the sub cross member 8 are formed of a metal material having high stiffness, and the energy absorption member 10 is formed of a metal material that can be more easily plastically deformed than the auxiliary frame 9 or the sub cross member 8. Accordingly, when a large impact load is input from the rear section of the vehicle body, the energy absorption member 10 is plastically deformed in advance of the auxiliary frame 9 or the sub cross member 8, and the impact load input thereby is absorbed.

The energy absorption member 10 is disposed at a lower side of the recessed section surface 2B of the rear edge portion of the vehicle body floor 2. The rear edge portion of the energy absorption member 10 swells downward in a protruding shape substantially along a shape of the lower surface of the rear edge portion of the vehicle body floor 2. A pulling hook 11 configured to attach a pulling rope to the vehicle is fixed to a swelling portion 10b of the energy absorption member 10 by welding. The pulling hook 11 is formed by a rod-shaped metal member curved in a substantially V shape. In the vehicle 1 according to the embodiment, since the rear edge portion of the vehicle body floor 2 is formed to be recessed downward in a recessed shape, the pulling hook 11 attached to the rear edge portion of the vehicle body floor 2 via the energy absorption member 10 is disposed at a sufficiently low position of the rear end portion of the vehicle body.

In addition, as shown in FIG. 2, a locking boss section 13 configured to lock a tire fixing clamp metal fitting 12 is fixed to a substantially central position on the reference placing surface 2A of the vehicle body floor 2 by welding. The spare tire 4 is laid and placed sideways on the reference placing surface 2A of the vehicle body floor 2. In the spare tire 4 disposed on the reference placing surface 2A, a clamp metal fitting 12 having a front end portion locked to the locking boss section 13 is inserted through a wheel section 4A, and the clamp metal fitting 12 is fixed to the vehicle body floor 2 by being fastened from above by a tool. Here, while a major portion of a side surface of a tire section 4B of the spare tire 4 abuts on the reference placing surface 2A of the vehicle body floor 2, since the recessed section surface 2B recessed downward with respect to the reference placing surface 2A is continuously formed at the rear edge portion of the vehicle body floor 2, a portion of the tire section 4B of the spare tire 4 overhangs over the recessed section surface 2B.

Here, a pair of assembly brackets 14 (auxiliary supporting members) configured to support the portion of the tire section 4B of the spare tire 4 overhanging over the recessed section surface 2B from below is attached to the recessed section surface 2B of the vehicle body floor 2. The assembly brackets 14 are formed by a plate-shaped metal member curved in a predetermined shape through pressing or the like.

Each of the assembly brackets 14 are fixed to the recessed section surface 2B via fastening brackets 15 fixed to the recessed section surface 2B of the vehicle body floor 2. Like the assembly brackets 14, the fastening brackets 15 are formed by a plate-shaped metal member curved in a predetermined shape by pressing or the like.

Figure 4:
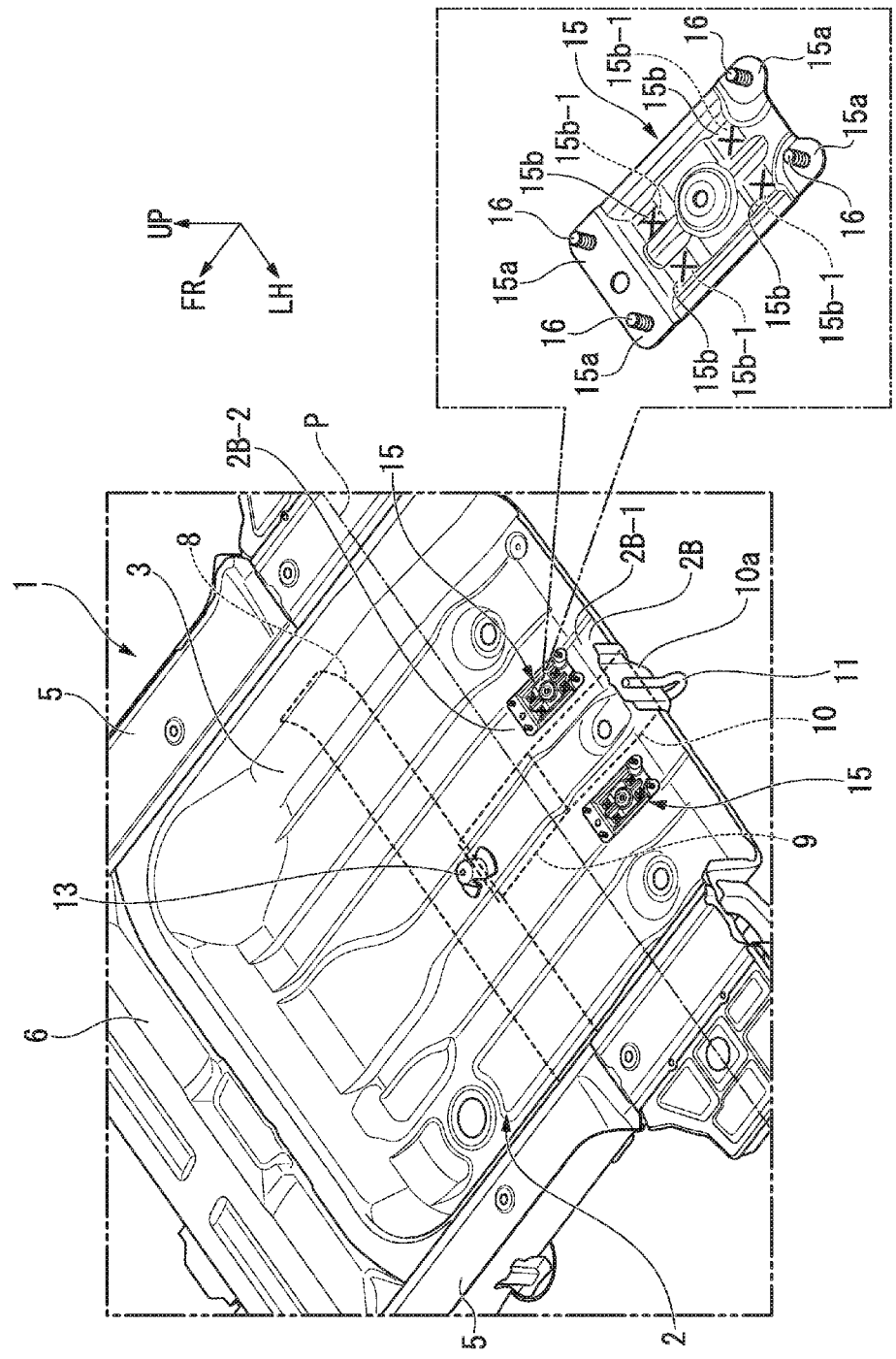
FIG. 4 is a perspective view showing the rear section of the vehicle body of the vehicle according to the embodiment of the present invention when seen from a rear upper side.

FIG. 4 is a view showing a portion of the vehicle body floor 2 of the luggage room of the vehicle 1 when seen from an upper side of the left rear section, and is distinguished from FIG. 1 in that the assembly brackets 14 are removed from the recessed section surface 2B.

As also shown in FIG. 2, the recessed section surface 2B of the vehicle body floor 2 has a substantially horizontal lower surface section 2B-1 located lower than the reference placing surface 2A, and an inclined surface section 2B-2 configured to connect the lower surface section 2B-1 and the reference placing surface 2A. The inclined surface section 2B-2 is inclined toward a rear side of the vehicle body from the rear end portion of the reference placing surface 2A in a rearward and downward direction. The pair of fastening brackets 15 are fixed at two positions separated in the vehicle width direction within the recessed section surface 2B of the vehicle body floor 2.

Specifically, the left and right fastening brackets 15 are fixed at two positions separated from each other outward in the vehicle width direction (in leftward and rightward direction of the vehicle body) with respect to the energy absorption member 10 attached to the lower surface of the vehicle body floor 2. The assembly brackets 14 fastened and fixed to the fastening brackets 15 are also similarly disposed at two positions separated from each other outward in the vehicle width direction with respect to the energy absorption member 10.

In addition, the left and right fastening brackets 15 and the assembly brackets 14 are disposed at positions offset toward a rear side of the vehicle body with respect to bending inducing positions P which are set such that predetermined positions of the rear section of the vehicle body are bent upward when a large impact load is input from a rear side of the vehicle body. The bending inducing positions P are set by forming fragile sections at predetermined positions of the vehicle body frame section. The fragile sections are configured to bend the vehicle body frame section in a state in which the vehicle body frame section is desirably bent about the bending inducing positions P when a large impact load is input from a rear side of the vehicle body. In the embodiment, the bending inducing positions P are set at the vicinity of a boundary section between the reference placing surface 2A and the recessed section surface 2B of the vehicle body floor 2.

As shown in FIG. 4, each of the fastening brackets 15 is formed by a substantially rectangular plate-shaped member when seen in a plan view, and stud bolts 16 serving as fastening parts are disposed at four corners of the fastening brackets 15 while protruding upward. In the embodiment, upper surfaces of the four corners of the fastening bracket 15 where the upward protruding stud bolts 16 are disposed are made as fastening surfaces 15a. In addition, lower walls 15b recessed downward with respect to the fastening surfaces 15a are formed at inner portions surrounded by the fastening surfaces 15a of the four corners of the fastening bracket 15. Back surfaces of the lower walls 15b are made as joining surfaces 15b-1 fixed to the recessed section surface 2B of the vehicle body floor 2 by welding. Accordingly, the fastening surfaces 15a of the four corners of the fastening bracket 15 are disposed higher than the joining surfaces 15b-1 at a predetermined height.

Further, in the case of the embodiment, the joining surfaces 15b-1 of the fastening bracket 15 are fixed to the inclined surface section 2B-2 within the recessed section surface 2B of the vehicle body floor 2.

In addition, as shown in FIG. 1, the assembly brackets 14 are formed of a plate-shaped member in substantially the same shape and size as the fastening brackets 15 when seen in a plan view. Bolt insertion holes 14a into which the stud bolts 16 of the four corners of the fastening bracket 15 are inserted are formed in the four corners of each of the assembly brackets 14. Fastening nuts 17 are fastened to the stud bolts 16 protruding from the bolt insertion holes 14a toward the upper surface of the assembly bracket 14, and thus, the assembly bracket 14 is fixed to the fastening bracket 15. Portions of the four corners of the assembly bracket 14 in which the bolt insertion holes 14a are formed are made as abutting walls 14b that abut the fastening surfaces 15a of the fastening bracket 15. Further, in the embodiment, portions of the bolt insertion holes 14a into which the stud bolts 16 are inserted constitute fastening sections of each the assembly brackets 14.

In addition, the assembly bracket 14 has a support wall 14c which is bent upward from the abutting walls 14b of front and rear sides in a crank shape and the upper surface is substantially horizontal. The upper surface of the support wall 14c is set to have a substantially same height as the reference placing surface 2A of the vehicle body floor 2 in a state in which the assembly bracket 14 is fastened and fixed to the corresponding fastening bracket 15. The upper surface of the support wall 14c constitutes an article support surface 14c-1 configured to support the lower surface of the tire section 4B of the spare tire 4 overhanging from the reference placing surface 2A in a direction of the recessed section surface 2B.

As described above, in the article support structure for a vehicle according to the embodiment, the assembly bracket 14 having the upper surface serving as the article support surface 14c-1 having substantially the same height as the reference placing surface 2A of the vehicle body floor 2 can be detachably fastened and fixed to the recessed section surface 2B of the vehicle body floor 2. For this reason, when the spare tire 4 is placed on the reference placing surface 2A of the vehicle body floor 2, the lower surface of the portion of the spare tire 4 overhanging over the recessed section surface 2B can be stably supported by the article support surfaces 14c-1 of the assembly brackets 14. Accordingly, when the wheel section 4A of the spare tire 4 is fastened to the locking boss section 13 on the vehicle body floor 2 by the clamp metal fitting 12 later on, the lower surface of the tire section 4B of the spare tire 4 is pushed against the reference placing surface 2A and the assembly brackets 14, and the spare tire 4 can be stably fixed into the article accommodating section 3.

In addition, in the article support structure according to the embodiment, since the assembly bracket 14 has the bolt insertion hole 14a serving as the fastening section and can be detachably attached to the recessed section surface 2B of the vehicle body floor 2, when the spare tire 4 is not placed and fixed onto the vehicle body floor 2, the assembly brackets 14 can be removed from the recessed section surface 2B to secure a wider effective space above the vehicle body floor 2.

Further, in the article support structure according to the embodiment, since the fastening bracket 15 having the stud bolts 16 serving as the fastening part is fixed to the recessed section surface 2B of the vehicle body floor 2 by welding, in comparison with the case in which the stud bolts 16 are directly installed at the recessed section surface 2B of the vehicle body floor 2, the stud bolts 16 can be easily installed on the recessed section surface 2B. In addition, even the fastening brackets 15 are always installed at the recessed section surface 2B of the vehicle body floor 2, the fastening brackets 15 are made to be a thin type in addition to a state where the assembly brackets 14 are removed from the recessed section surface 2B, a sufficiently wide effective space on the vehicle body floor 2 can be secured.

In addition, in the article support structure according to the embodiment, since the fastening bracket 15 has the joining surface 15b-1 joined to the recessed section surface 2B, and the fastening surface 15a disposed upper than the joining surface 15b-1 and to which the assembly bracket 14 is fastened, the stud bolts 16 can be easily installed within the recessed section surface 2B without forming holes in the vehicle body floor 2.

Accordingly, as this structure is employed, intrusion of water or dust onto the vehicle body floor 2 can be suppressed.

In addition, in the article support structure according to the embodiment, since the assembly brackets 14 have the abutting wall 14b abutting the fastening surface 15a of the fastening bracket 15 and the support wall 14c which is bent upward from the abutting wall 14b in a crank shape and in which the upper surface thereof is serving as the article support surface 14c-1, a supporting form of the assembly bracket 14 can be easily modified by modifying the curved shape of the assembly bracket 14. Accordingly, as this structure is employed, it is possible to easily manage with vehicles or articles having different specifications by simply change of shape of the assembly bracket 14.

Figure 5:
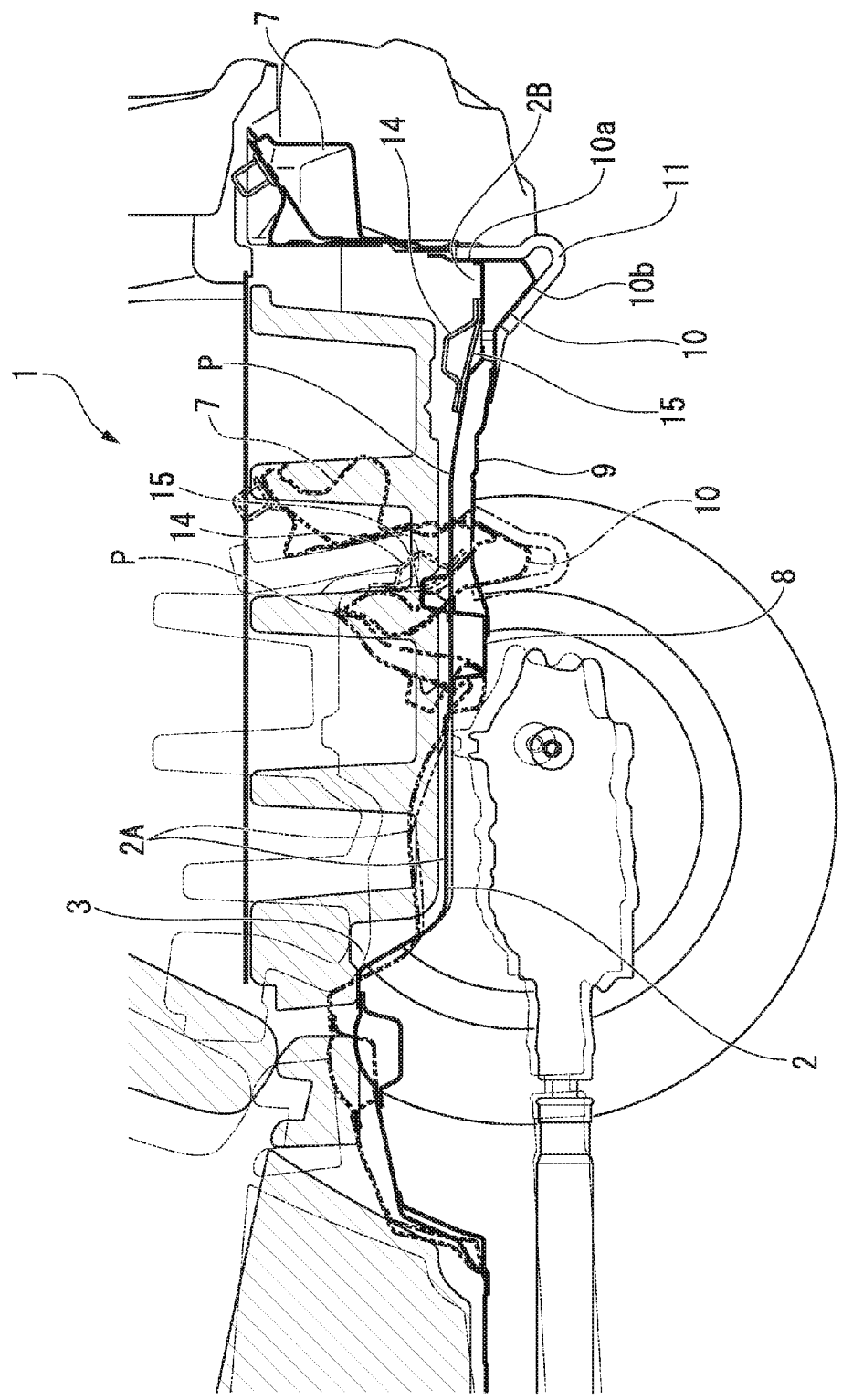
FIG. 5 is a cross-sectional view taken along line II-II of FIG. 1 of the vehicle according to the embodiment of the present invention.

Further, in the article support structure according to the embodiment, the fastening brackets 15 and the assembly brackets 14 are disposed at positions that are offset at a rear side with respect to the bending inducing positions P of the vehicle body. For this reason, upon input of an impact load from the rear side of the vehicle, as shown in FIG. 5, when the vehicle body is bent and deformed about the bending inducing positions P, the fastening brackets 15 and the assembly brackets 14 do not interfere with deformation of the vehicle body about the bending inducing positions P. Accordingly, when this structure is employed, the vehicle body can be bent as desired to efficiently absorb impact energy, and it is possible to suppress a collapse of a portion of the vehicle body where it is not intended to be collapsed, as designed.

In addition, in the vehicle according to the embodiment, the energy absorption member 10 extending substantially in the forward and rearward direction of the vehicle body is disposed below the vehicle body floor 2, and the fastening brackets 15 and the assembly brackets 14 are disposed at positions spaced apart from each other outward in the vehicle width direction of the energy absorption member 10. For this reason, when a large impact load is input into the vehicle body from the rear side and the energy absorption member 10 collapses, the fastening brackets 15 and the assembly brackets 14 do not interfere with collapse of the energy absorption member 10. Accordingly, when this structure is employed, the energy absorption member 10 can function upon input of the impact load as desired.

In addition, in the article support structure according to the embodiment, the recessed section surface 2B of the vehicle body floor 2 has the substantially horizontal lower surface section 2B-1 disposed below the reference placing surface 2A and the inclined surface section 2B-2 configured to connect the lower surface section 2B-1 and the reference placing surface 2A, and the fastening brackets 15 are fixed to the inclined surface section 2B-2 of the recessed section surface 2B by welding. For this reason, the load input from above of the assembly brackets 14 can be distributed and supported by the reference placing surface 2A and the lower surface section 2B-1 of the recessed section surface 2B of the vehicle body floor 2 via the fastening brackets 15 and the inclined surface section 2B-2 of the recessed section surface 2B. Accordingly, as this structure is employed, the spare tire 4 can be supported with sufficient support strength.

Further, the present invention is not limited to the embodiment and various design changes may be made without departing from the scope of the present invention. For example, in the embodiment, while the pair of fastening brackets 15 are fixed to the recessed section surface 2B of the vehicle body floor 2 by welding and the assembly brackets 14 are attached to the fastening brackets 15, the number of fastening brackets 15 and assembly brackets 14 installed is not limited to two and is arbitrary. In addition, in the embodiment, while the stud bolts 16 are installed at the fastening bracket 15, weld nuts instead of the stud bolts 16 may be installed at the fastening bracket 15.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An article support structure for a vehicle comprising:
    a vehicle body floor having a substantially flat reference placing surface onto which an article is placed and fixed, and a recessed section surface continuously formed at an edge of the reference placing surface and recessed downward with respect to the reference placing surface; and
    an auxiliary supporting member detachably attached to the recessed section surface and configured to support a portion of the article placed on the reference placing surface from below,
    wherein the auxiliary supporting member comprises an article support surface having substantially same upper surface height as the reference placing surface in a state in which the auxiliary supporting member is attached to the recessed section surface, and a fastening section configured to fasten the auxiliary supporting member with the recessed section surface and release fastening.

2. The article support structure for a vehicle according to claim 1,
    wherein a fastening bracket having a fastening part, to which the fastening section of the auxiliary supporting member is fastened, is joined to the recessed section surface.

3. The article support structure for a vehicle according to claim 2,
    wherein the fastening bracket has a joining surface joined to the recessed section surface, and a fastening surface disposed above the joining surface and to which the auxiliary supporting member is fastened.

4. The article support structure for a vehicle according to claim 3,
    wherein the auxiliary supporting member has an abutting wall that abuts the fastening surface of the fastening bracket, and a support wall which is bent upward from the abutting wall in a crank shape and having an upper surface serving as the article support surface.

5. The article support structure for a vehicle according to claim 2,
    wherein the fastening bracket and the auxiliary supporting member are disposed at positions offset in the forward and rearward direction of the vehicle body with respect to a bending inducing position of the vehicle body upon input of an impact.

6. The article support structure for a vehicle according to claim 3,
    wherein the fastening bracket and the auxiliary supporting member are disposed at positions offset in the forward and rearward direction of the vehicle body with respect to a bending inducing position of the vehicle body upon input of an impact.

7. The article support structure for a vehicle according to claim 4,
wherein the fastening bracket and the auxiliary supporting member are disposed at positions offset in the forward and rearward direction of the vehicle body with respect to a bending inducing position of the vehicle body upon input of an impact.

8. The article support structure for a vehicle according to claim 2,
wherein an energy absorption member extending substantially in the forward and rearward direction of the vehicle body is disposed under the vehicle body floor, and
the fastening bracket and the auxiliary supporting member are disposed at positions spaced apart from the energy absorption member in leftward and rightward direction of the vehicle body.

9. The article support structure for a vehicle according to claim 3,
wherein an energy absorption member extending substantially in the forward and rearward direction of the vehicle body is disposed under the vehicle body floor, and
the fastening bracket and the auxiliary supporting member are disposed at positions spaced apart from the energy absorption member in leftward and rightward direction of the vehicle body.

10. The article support structure for a vehicle according to claim 4,
wherein an energy absorption member extending substantially in the forward and rearward direction of the vehicle body is disposed under the vehicle body floor, and
the fastening bracket and the auxiliary supporting member are disposed at positions spaced apart from the energy absorption member in leftward and rightward direction of the vehicle body.

11. The article support structure for a vehicle according to claim 5,
wherein an energy absorption member extending substantially in the forward and rearward direction of the vehicle body is disposed under the vehicle body floor, and
the fastening bracket and the auxiliary supporting member are disposed at positions spaced apart from the energy absorption member in leftward and rightward direction of the vehicle body.

12. The article support structure for a vehicle according to claim 6,
wherein an energy absorption member extending substantially in the forward and rearward direction of the vehicle body is disposed under the vehicle body floor, and
the fastening bracket and the auxiliary supporting member are disposed at positions spaced apart from the energy absorption member in leftward and rightward direction of the vehicle body.

13. The article support structure for a vehicle according to claim 7,
wherein an energy absorption member extending substantially in the forward and rearward direction of the vehicle body is disposed under the vehicle body floor, and
the fastening bracket and the auxiliary supporting member are disposed at positions spaced apart from the energy absorption member in leftward and rightward direction of the vehicle body.

14. The article support structure for a vehicle according to claim 2,
wherein the recessed section surface has a substantially horizontal lower surface section disposed lower than the reference placing surface, and an inclined surface section configured to connect the lower surface section and the reference placing surface, and
wherein the fastening bracket is joined to the inclined surface section.

* * * * *